United States Patent [19]

Scopazzi et al.

[11] Patent Number: 5,859,136
[45] Date of Patent: Jan. 12, 1999

[54] COATING COMPOSITION CONTAINING AN AMINE FUNCTIONAL DISPERSED POLYMER AND AN ISOCYANATE CURING AGENT

[75] Inventors: Christopher Scopazzi; Laura A. Lewin, both of Wilmington, Del.; Samuel J. Kincaid, Swedesboro, N.J.

[73] Assignee: E. I. du Pont de Nemours and Company, Wilmington, Del.

[21] Appl. No.: 963,184

[22] Filed: Nov. 3, 1997

[51] Int. Cl.$^6$ ............... C08G 63/48; C08F 8/30; C08L 75/00; C08L 51/00
[52] U.S. Cl. ............... 525/123; 524/504; 525/63; 525/64; 525/66; 525/902
[58] Field of Search ............... 525/123, 63, 64, 525/902; 524/504

[56] References Cited

U.S. PATENT DOCUMENTS

| | | | |
|---|---|---|---|
| 3,923,723 | 12/1975 | Klein | 260/33.6 |
| 4,232,135 | 11/1980 | Bentley et al. | 525/509 |
| 4,340,511 | 7/1982 | Backhouse et al. | 524/504 |
| 4,533,695 | 8/1985 | Theodore et al. | 524/504 |
| 4,568,473 | 2/1986 | Theodore et al. | 252/51.5 |
| 4,740,055 | 4/1988 | Kanda et al. | 350/96.3 |
| 4,743,653 | 5/1988 | Numata et al. | 525/125 |
| 4,777,213 | 10/1988 | Kanda et al. | 525/114 |
| 5,010,140 | 4/1991 | Antonelli et al. | 525/269 |
| 5,135,970 | 8/1992 | Honel et al. | 523/414 |
| 5,159,017 | 10/1992 | Miyazono et al. | 525/123 |
| 5,176,959 | 1/1993 | Yamada et al. | 428/403 |
| 5,244,959 | 9/1993 | Hazan et al. | 525/504 |
| 5,373,052 | 12/1994 | Fukuda et al. | 525/54.1 |
| 5,387,619 | 2/1995 | Lee et al. | 521/133 |
| 5,468,801 | 11/1995 | Antonelli et al. | 524/504 |
| 5,516,820 | 5/1996 | Babjak et al. | 523/523 |

FOREIGN PATENT DOCUMENTS

| | | | |
|---|---|---|---|
| 0 264 834 | 4/1988 | European Pat. Off. | C25D 15/00 |

*Primary Examiner*—Patrick D. Niland
*Attorney, Agent, or Firm*—Hilmar L. Fricke

[57] ABSTRACT

A coating composition containing about 40–90% by weight of film forming binder and 10–60% by weight of an organic liquid carrier;

wherein the binder contains about (a) 50–90% by weight, based on the weight of the binder, of a dispersed acrylic polymer having (i) a core of gelled polymerized ethylenically unsaturated monomers which is not soluble in the organic liquid carrier and having amine functional groups and having chemically grafted thereto (ii) substantially linear stabilizer polymeric components that are soluble in the organic liquid carrier and comprise polymerized ethylenically unsaturated monomers and have a weight average molecular weight of about 1,000–20,000 determined by GPC (gel permeation chromatography) using polystyrene as the standard;

wherein the monomers of the core and the stabilizer polymeric components are individually selected from the following group of monomers of alkyl (meth) acrylates, wherein the alkyl groups have 1–12 carbon atoms, hydroxy alkyl (meth)acrylate, wherein the alkyl groups have 1–4 carbons atoms, styrene, alkyl styrene, vinyl toluene, acrylonitrile, glycidyl (meth)acrylate, isobornyl (meth)acrylate, alpha-beta ethylenically unsaturated monocarboxylic acids and any mixtures thereof and the core contains about 5–40% by weight of polymerized ethylenically unsaturated glycidyl (meth) acrylate monomers reacted with a primary amine or a ketimine forming amine functional components that are capable of reacting with component (b); and (b) 10–50% by weight, based on the weight of the binder, of an organic polyisocyanate crosslinking agent.

14 Claims, No Drawings

COATING COMPOSITION CONTAINING AN AMINE FUNCTIONAL DISPERSED POLYMER AND AN ISOCYANATE CURING AGENT

TECHNICAL FIELD

This invention relates to high solids solvent based coating compositions having a low VOC (volatile organic content), relatively rapid cure rate and an extended "pot life" useful for coating automobiles and trucks.

BACKGROUND OF THE INVENTION

Solvent based coating compositions useful as original equipment coatings and refinish coatings for automobiles and trucks that are composed of an acrylic polymer and an organic polyisocyanate crosslinking agent provide coatings of excellent quality and are well known in the art. One problem with such coating compositions has been the relatively high VOC content of these compositions. In an effort to reduce VOC, low molecular weight polymers have been used but these polymers increase the drying time of the composition as it cures. During curing a high molecular weight film is formed. Longer drying times reduce productivity in auto refinish shops by requiring the auto or truck to remain for a longer period of time in the area in which it was sprayed. A short rapid cure is desirable which leaves the coating in a tack free state and allows the auto or truck to be moved to another location to fully cure the coating usually under ambient temperature condition.

Attempts have been made to decrease the curing time of these coating compositions by using more reactive components or catalysts. However, while these decrease curing time since components of the coating composition are more reactive, they usually reduce the "pot life" of the coating composition as well. In the most extreme case, instant gellation of the composition occurs when, for example, the polyisocyanate is added to a polymer having reactive amine groups.

By "pot life" is meant the amount of time the viscosity of the composition remains at a sufficiently low level to be applied by conventional techniques which is usually done by spraying.

It would be desirable to have a coating composition that would cure rapidly after application to a "touch" dry state, i.e., dust and dirt does not stick and the finish is dry to the touch and have a pot life of several hours which would make the coating composition useful in an auto refinish operation or in a production facility such as an auto or truck manufacturing plant. The coating composition of this invention uses a polymer with reactive amine groups that when blended with a polyisocyanate does not gel but has an acceptable pot life but does cure rapidly to a touch dry state in a short time and cures to form a film with excellent properties such as high hardness, excellent mar and scratch resistance and excellent long term weathering properties.

SUMMARY OF THE INVENTION

A coating composition containing about 40–90% by weight of film forming binder and 10–60% by weight of an organic liquid carrier;

wherein the binder contains about (a) 50–90% by weight, based on the weight of the binder, of a dispersed acrylic polymer having
   (i) a core of gelled polymerized ethylenically unsaturated monomers which is not soluble in the organic liquid carrier and having amine functional groups and having chemically grafted thereto
   (ii) substantially linear stabilizer polymeric components that are soluble in the organic liquid carrier and comprise polymerized ethylenically unsaturated monomers and have a weight average molecular weight of about 1,000–20,000 determined by GPC (gel permeation chromatography) using polystyrene as the standard;
   wherein the monomers of the core and the stabilizer polymeric components are individually selected from the following group of monomers of alkyl (meth)acrylates, wherein the alkyl groups have 1–12 carbon atoms, hydroxy alkyl (meth)acrylate, wherein the alkyl groups have 1–4 carbons atoms, styrene, alkyl styrene, vinyl toluene, acrylonitrile, glycidyl (meth)acrylate, isobornyl (meth)acrylate, alpha-beta ethylenically unsaturated monocarboxylic acids and any mixtures thereof and the core contains about 5–40% by weight of polymerized ethylenically unsaturated glycidyl (meth) acrylate monomers reacted with a primary amine or a ketimine forming amine functional components that are capable of reacting with component (b); and (b) 10–50% by weight, based on the weight of the binder, of an organic polyisocyanate crosslinking agent.

DETAILED DESCRIPTION OF THE INVENTION

The term (meth)acrylate as used herein denotes esters of both acrylic acid and methacrylate acid.

The novel composition of this invention has a relatively long pot life and also dries to the touch in a short time and then cures to a hard tough finish at ambient temperatures in a few hours. This is particularly advantageous in refinishing automobiles and trucks. For example, in repairing a clear coat/color coat finish of an automobile or truck, generally the color coat is applied and dried for a short time but not cured and then the clear coat is applied and both coats are cured all at ambient temperatures. If necessary, the cured clear coat is buffed to improve appearance and remove minor imperfections. For a finish to be buffable it must be hard but not tough. The coating composition of this invention has a short drying time and thereby improves the rate of processing vehicles through a typical repair facility. In particular, the novel composition has a short tack and dust free time (about 2 hours after application). When used as a clear finish, the vehicle can be moved out of the work area to provide room for another vehicle to be painted. Drying time and curing time can be reduced by baking at relatively low temperatures of 40°–125° C. Similarly, if the novel composition is used as a primer, it can be sanded in a short period of time after application and a top coat can then be applied.

These advantages of the novel composition are the result of having a reactive functional group such as an amine in the gelled core of the dispersed acrylic polymer used in the composition. In the coating composition, theses reactive groups are not readily available to react with the crosslinking agent, such as an isocyanate and the composition does not gel nor is there an excessive increase in viscosity which would make the composition unusable. For this reason, the composition has an extended pot life. Obviously, after a relatively long period of time, the isocyanate crosslinker will penetrate the gel structure of the acrylic polymer and a reaction will occur. The composition does not have a pot life of days but of hours which is a significant improvement for isocyanate/acrylic compositions, in particular in compositions in which the acrylic polymer is amine functional. The amine isocyanate reaction is very rapid and instant gellation of a composition usually occurs unless the amine or isocyanate is blocked or protected in some manner. After the composition is applied and solvent evaporates in the drying process, the amine groups in the core of the acrylic polymer become available and rapidly react with the isocyanate crosslinking agent to form a crosslinked finish which is dry to the touch in a short period and cures to a hard durable finish in a relatively short time at ambient temperatures.

Other possible crosslinking reactions that may be utilized in the novel coating composition are epoxy/amine crosslinking and epoxy/anhydride crosslinking. The epoxy groups are in the core of the acrylic polymer and the amine or anhydride groups are on a linear or branched chain polymer which is in solution. Also, the amine or anhydride groups can be in the core of the acrylic polymer and the epoxy groups on a polymer in solution.

An advantage of the amine/isocyanate reaction as used in this invention is it is faster than the above reactions and does not require a catalyst and provides a durable end product. An alternative approach would be to have the isocyanate function in the core of the acrylic polymer and the amine function on a polymer or oligomer in solution. This is not preferred because isocyanate functional monomers used the core of the acrylic polymer are not generally available and are expensive.

The novel coating composition is solvent based and contains about 10–60% by weight of an organic liquid carrier and correspondingly, about 90–40% by weight of film forming binder and preferably has a VOC of about 3.5–4.5 pounds of solvent per gallon of coating composition. The binder contains about 50–90% by weight of a dispersed acrylic polymer and about 10–50% by weight of an isocyanate crosslinking agent.

Generally, the novel coating composition is used as a clear coat but can be pigmented with conventional pigments and used as a monocoat or as basecoat or as a primer.

The dispersed acrylic polymer used to formulate the coating composition of this invention has a gelled core containing the amine functional groups. The core is not soluble in the organic liquid carrier and has grafted thereto linear stabilizer polymeric components. Preferably, the polymer contains about 30–70% by weight of the core and 70–30% by weight of substantially linear stabilizer polymeric components. These linear stabilizer components are soluble in the organic carrier liquid used to form the coating composition and keeps the acrylic polymer dispersed in the liquid while the core is insoluble in this liquid. The acrylic polymer can be envisioned as being composed of a core containing functional amino groups and has a plurality of linear stabilizer components attached thereto. The core has reactive amino functional groups capable of reacting with an isocyanate crosslinking agent but since the these functional groups are in the gelled core structure, they are not available to immediately react with the isocyanate crosslinking agent in the coating composition until after application. This makes it possible to form the novel coating composition.

If a conventional acrylic polymer with amino groups that are readily available is used, the composition gels almost instantaneously after addition of an isocyanate since the amine groups are available to react with the isocyanate. Also, when comparing the pot life of the composition of this invention to conventional coating compositions wherein an acrylic polymer having reactive hydroxyl groups is used in combination with an isocyanate, the pot life of the novel composition of this invention is substantially longer.

The linear stabilizer polymeric components of the polymer comprises polymerized ethylenically unsaturated monomers and have ethylenically unsaturated moieties that are polymerizable with core monomers and have a weight average molecular weight of 1,000–20,000, preferably 5,000 to 10,000. About 30–70% (by weight), preferably 40–60%, of the linear stabilizer polymeric component is polymerized with 70–30%, preferably 60–40%, of a blend of other ethylenically unsaturated monomers which form the core of the acrylic polymer. About 5–40%, preferably 5–30% by weight, of the monomers in the case have amine functional groups that are capable of reacting with the polyisocyanate crosslinking agent.

The dispersed acrylic polymer is prepared by first forming the substantially linear stabilizer components having polymerizable ethylenically unsaturated groups and then polymerizing these components with the ethylenically unsaturated core monomers in a solvent medium in which the core of the resulting polymer is insoluble. The resulting polymer is then reacted with a primary amine or a ketimine which reacts with the glycidyl groups present in the insoluble core of the polymer.

The substantially linear stabilizer polymeric component of the acrylic polymer can be prepared by using convention azo or peroxy polymerization initiators with conventional solvents. The ethylenically unsaturated monomers including an ethylenically unsaturated acid monomer such as acrylic or methacrylic acid in the presence of solvent and a polymerization initiator are reacted for about 0.5–6 hours at about 75°–150° C., usually at the reflux temperature of the reaction mixture. Glycidyl (meth)acrylate monomer is then added, preferably with a catalyst such as an alkyl amino alcohol such as N,N-dimethyl amino propanol and reacted until the glycidyl groups have reacted with the acid groups of the polymer which takes about 0.5–4 hours at the reflux temperature of the reaction mixture which is about 75°–150° C. A substantially linear stabilizer component is formed having double bonds that are readily polymerizable with other ethylenically monomers used to form the core of the acrylic polymer used in this invention.

Another method that can be used to form the linear stabilizer polymeric components is to use group transfer polymerization techniques as taught in U.S. Pat. No. 4,746,714 or by using catalytic cobalt chain transfer agent to ensure that the resulting stabilizer components have one terminal ethylenically unsaturated group which will polymerize with the core monomers to form the acrylic polymer. Typically, in the first step of the process for preparing the stabilizer using a cobalt chain transfer agent, the monomers are blended with an inert organic solvent and a cobalt chain transfer agent and heated usually to the reflux temperature of the reaction mixture. In subsequent steps, additional monomers and cobalt catalyst and conventional polymerization catalyst are added and polymerization is continued until a stabilizer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethylglyoximato) cobaltate(II) and diaquabis (borondifluorophenylglyoximato) cobaltate (II). Cobalt (III) versions of these catalysts are also preferred. Typically these chain transfer agents are used at concentrations of about 5–1000 ppm based on the monomers used. The stabilizer is preferably formed in a solvent or solvent blend using a free radical initiator and a Co (II) or (III) chelate chain transfer agent. Peroxy- and azo-initiators (0.5–5% weight on monomer) can be used in the synthesis of the macromonomers in the presence of 2–5,000 ppm (on total monomer) or Co (II) chelate in the temperature range between 70°–160° C.

After the stabilizer is formed by either method as described above, solvent is optionally stripped off and the core monomers are added to the stabilizer along with additional solvents and polymerization initiator. The solvent medium is such as to render insoluble the polymeric core of the dispersed polymer. About 5–40% by weight, preferably 5–30% by weight of the core monomers of glycidyl (meth) acrylate monomers must be used. Polymerization is continued at or below the reflux temperature of the reaction mixture to form the desired dispersed polymer. The glycidyl groups are subsequently reacted with a primary amine or with a ketimine to form reactive amino groups on the core for reaction with the isocyanate crosslinking agent in a coating composition. Generally, in this reaction the equivalence of amine to epoxy or glycidyl groups is about 0.6–0.95 and preferably, 0.75–0.95. If a diketimine is used the equivalence of diketimine to epoxy or glycidyl groups is 0.1–0.95 and preferably, 0.3–0.8. The extent of the reaction of epoxy with amine or diketimine can be followed with infrared or by reacting residual epoxy with t-butyl ammonium iodide followed by titration of hydrogen iodide with standard perchloric acid.

An alternate approach to forming the dispersed acrylic polymer is to conduct co-polymerization of the linear stabilizer polymer and the core monomers in a solvent that solubilizes both the stabilizer and the core. Non-solvent for the core is added to form the dispersion. Reaction of the epoxy and amine or ketimine can be conducted before or after the addition of non-solvent.

An alternative method of forming the acrylic polymer is to use an alkyl amino alkyl (meth)acrylate monomer, such as t-butyl amino ethyl methacrylate in the core to provide reactive amine groups instead of as described above using glycidyl (meth)acrylate which is subsequently reacted with amine or ketimine to provide reactive amino groups.

Typical initiators that can be used to form the linear stabilizer polymer and/or the dispersed acrylic polymer are the azo type catalysts such as, 2,2'-azobis (2,4 dimethylpentane nitrile), 2,2'-azobis (2-methylpropane nitrile), 2,2'-azobis (2-methylbutane nitrile), 1,1'-azo (cyclohexane carbonitrile) and 4,4'azobis (4-cyanopentanoic) acid as can other suitable initiators such as peroxides and hydroperoxides. Typical of such initiators are di-tertiarybutyl peroxide, di-cumylperoxide, tertiaryamyl peroxide, cumenehydroperoxide, di(n-propyl) peroxydicarbonate, peresters such as amyl peroxyacetate and the like. Commercially available peroxy type initiators include, e.g., t-butylperoxide or Triganox® B from AKZO, t-butylperacetate or Triganox® FC50 from AKZO, t-butylperbenzoate or Triganox® C from AKZO, and t-butylperpivalate or Triganox® 25 C-75 from AKZO.

Typical solvents that can be used to form the stabilizer or the acrylic polymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as ethylene glycol mono butyl ether, aromatic solvents such as xylene and toluene, and the like. Non-solvents for the core of the acrylic polymer that are added to form the acrylic polymer dispersion that do not dissolve the core of the acrylic polymer are for example, mineral spirits and aliphatic solvents such as heptane.

Typical monomers that can be used to form the core or the stabilizer are for example (but not limited to), (meth)acrylate esters of straight-chain or branched monoalcohols of 1 to 12 carbon atoms. Preferred esters are alkyl (meth)acrylates having 1–12 carbons in the alkyl group such as methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like. Isobornyl (meth)acrylates and cycloaliphatic (meth) acrylates can be used such as trimethylcyclohexyl acrylate, t-butyl cyclohexyl acrylate, cyclohexyl methacrylate, isobornyl methacrylate, 2-ethylhexyl methacrylate, and the like. Aryl (meth)acrylates such as benzyl acrylate and benzyl methacrylate also can be used.

Ethylenically unsaturated monomers can be used containing hydroxy functionality include hydroxy alkyl (meth) acrylates wherein the alkyl group has 1 to 4 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof.

The core may be crosslinked which is preferable or non-crosslinked. Crosslinking of the core is accomplished by the use of di- or tri-(meth)acrylates as part of the core monomers. Examples of such monomers include 1,4-butane diol di(meth)acrylate, 1,2-ethylene glycol di(meth)acrylate and allyl methacrylate. Crosslinking of the core can be achieved by including acid monomers in the core. The acid functionality reacts with a small portion of the epoxy groups during polymerization to provide crosslinking of the core.

Ethylenically unsaturated acid monomers that can be used in the stabilizer and core of the acrylic polymer are ethylenically unsaturated monocarboxylic acids such as acrylic acid, methacrylic acid, maleic acid, itaconic acid and the like. Acrylic acid, methacrylic acid are preferred. Other acids that can be used are ethylenically unsaturated sulfonic, sulfinic, phosphoric or phosphonic acid and esters thereof; typically, styrene sulfonic acid, acrylamido methyl propane sulfonic acid, vinyl phosphonic or phosphoric acid and its esters and the like, also can be used. Other acids monomers that can be used are the half esters of maleic acid and itaconic acid.

Suitable other olefinically unsaturated comonomers that can be used include: acrylonitrile, acrylamide and methacrylamide and derivatives as alkoxy methyl (meth) acrylamide monomers, such as methacrylamide, N-isobutoxymethyl methacrylamide, and N-methylol methacrylamide; vinyl aromatics such as styrene, alpha methyl styrene and vinyl toluene; and polyethylene glycol monoacrylates and monomethacrylates.

Other functional monomers such as allyl methacrylate, aceto acetoxyethyl methacrylate, trialkoxy silyl ethyl methacrylate, and the reaction products of glycidyl (meth) acrylate with mono functional acids having up to 22 carbon atoms can be used.

Typically useful primary amines that can be used to form the acrylic polymer are alkyl amines such as methyl amine, ethyl amine, propyl amine, butyl amine, hexyl amine, octyl amine and the like, amino alcohols such as methanol amine, ethanol amine, propanol amine and the like.

Ketimines that can be used are formed from ketones and an amine. Water formed in the reaction with the amine and the ketone is removed, for example, by azeotropic distillation. Useful ketones include dialkyl, diaryl and alkylaryl ketones having 3–13 carbon atoms. Specific examples of such ketones include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable primary amines are ethylene diamine, 1,3-diaminopropane, 1,4 diaminopropane, 1,6-diaminohexane and the like. One particularly useful ketimine is diketimine which is the reaction product of diethylenetriamine and methyl isobutyl ketone.

The core of the acrylic polymer is a gelled structure and may or may not be crosslinked. In one preferred embodiments, the acrylic polymer contains overall (including both core and macromonomer stabilizer components) about 5 to 40, parts by weight of hydroxy functional acrylic monomers as, e.g., 2-hydroxyethyl acrylate, 2-hydroxyethyl methacrylate, 2-hydroxypropyl acrylate, 2-hydroxypropyl methacrylate, 2-hydroxybutyl acrylate, 4-hydroxybutyl acrylate and the like. These hydroxy groups can be used for crosslinking with the polyisocyanate crosslinking agent in addition to the amine reactive groups on the acrylic polymer.

Particularly useful acrylic polymers include the following:

- an acrylic polymer having stabilizer having a weight average molecular weight of about 1,000–10,000 of polymerized monomers of styrene, butyl methacrylate, butyl acrylate, isobornyl methacrylate, methacrylic acid, and hydroxy-functional (meth)acrylate monomers, and glycidyl (meth)acrylate monomers and a core of polymerized monomers of styrene, hydroxyethyl methyl acrylate, methyl methacrylate, methyl acrylate and about 5–30% by weight, based on the weight of the macromonomer, of glycidyl methacrylate which has been reacted with a primary amine or ketimine; and
- an acrylic polymer having a core of polymerized monomers of styrene, hydroxy ethyl acrylate, methyl methacrylate, glycidyl methacrylate, methacrylic acid and methyl acrylate and the above stabilizer polymeric components.

The coating composition of this invention formed with the above described dispersed acrylic polymer contains a polyisocyante crosslinking agent.

Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetarnethylene xylene diisocyanate, ethyl ethylene diisocyanate, 2,3-dimethyl ethylene diisocyanate, 1-methyltrimethylene diisocyanate, 1,3-cyclopenthylene diisocyanate, 1,4-cyclohexylene diisocyanate, 1,3-phenylene diisocyanante, 1,5-naphthalene diisocyanate, bis-(4-isocyanatocyclohexyl)-methane, diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename Desmodur® N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimtheylol propane and is sold under the tradename of Cythane® 3160.

Blocked polyisocyanates also can be used if the composition is to be baked at elevated temperatures of 100°–150° C. Typical blocking agents are alcohols, ketimines, oximes and the like.

About 0–70% by weight, preferably 1–40% by weight, based on the weight of the binder, of an oligomer having a weight average molecular weight of about 200–2,000 and having functional components capable of reaction with the polyisocyanate crosslinking agent can be used in the novel composition to reduce the VOC content of the coating composition and improve mar and acid etch performance of films of the composition.

Typically useful oligomers include caprolactone oligomers which may be made by reacting caprolactone with a cyclic polyol. Particularly useful caprolactone oligomers are described on col. 4., line 3–col. 5, line 2 of U.S. Pat. No. 5,286,782. Other useful oligomers are polyester oligomers such as an oligomer of an alkylene glycol, like propylene glycol, an alkane diol, like hexane diol, and an anhydride like methyl hexahydrophthalic anhydride reacted to a low acid number. Another useful oligomer is an acid functional oligomer such as an oligomer of a polyol such as pentaerythritol reacted with an anhydride such as methyl hexahydrophthalic anhydride to an acid number of about 30–300, preferably 150–250. Other useful oligomers are hydroxy functional and are formed by reacting 1,2 epoxy butane with the above described acid functional oligomers using triethyl amine as a reaction catalyst resulting in very low (less than 20) acid number oligomers. Compatible mixtures of any of the aforementioned oligomers also can be used.

The coating compositions of the present invention can also contain up to 40% of total binder of an acrylic polymer or polyester having a weight average molecular weight greater than 2,000 for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacryly propyl trimethoxy silane and the like. Conventional polyesters can be used such as SCD®-1040 from Etna Products Inc.

To improve weatherability of the clear composition about 0. 1–10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as bis(1,2,2,6,6-pentamethyl-4-piperidinyl sebacate), di[4(2,2,6,6-tetramethyl piperidinyl)] sebacate and the like and any mixtures of any of the above.

The coating composition contains sufficient amount of a catalyst to cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like.

Generally, flow control agents are used in the composition in amounts of about 0.1–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying may also be used. The dry film thickness of the clear coating is about 0.5–5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

Generally, within about 2 hours after application, the clear coating is sufficiently cured to allow for buffing and polishing if needed to remove imperfections and improve gloss of the finish. The clear coating continues to cure and after 7–10 days reaches a relatively high level of hardness and toughness that is required for a durable and weatherable automotive finish.

The coating composition of this invention can also be pigmented and used as a base coat in a clear coat/color coat finish, as a monocoat or as a primer. The pigment to binder weight ratio (P/B) of such compositions can be from 0.1/100 to 200/100. Typically primers have a high P/B of 50/100–200/100. Typical pigments that are used in such a coating composition are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones, and metallic flake pigments such as aluminum flake, nickel flake and the like.

Coating compositions of this invention have excellent adhesion to a variety of metallic or non-metallic substrates, such as previously painted substrates, cold rolled steel, phosphatized steel, and steel coated with conventional primers by electrodeposition. These coating composition can be used to coat plastic substrates such as polyester reinforced fiberglass, reaction injection-molded urethanes and partially crystalline polyamides.

Coating compositions of this invention can be applied by conventional techniques such as spraying, electrostatic spraying, dipping, brushing, flowcoating and the like. The preferred techniques are spraying and electrostatic spraying. In refinish applications, the composition is dried and cured at ambient temperatures but can be forced dried at low baking temperatures of 40°–125° C. for about 5–30 minutes. For OEM (original equipment manufacture) applications, the composition is typically baked at 100°–150° C. for about 15–30 minutes to form a coating about 0.1–3.0 mils thick. When the composition is used as a clearcoat, it is applied over the color coat which may be dried to a tack-free state and cured or preferably flash dried for a short period before the clearcoat is applied. The color coat/clearcoat finish is then baked as mentioned above to provide a dried and cured finish. The composition may be used as a primer and applied and dried for short period and then sanded and coated with a topcoat. The present invention is also applicable to non-baking refinish systems, as will be readily appreciated by those skilled in the art.

The following Examples illustrate the invention. All parts and percentages are on a weight basis unless otherwise indicated. All molecular weights disclosed herein are determined by GPC (gel permeation chromatography) using a polystyrene standard.

EXAMPLE 1

A stabilizer polymer was prepared which was then polymerized with core monomers to form a nonaqueous polymer dispersion and subsequently reacting with an amine.

Preparation of a Stabilizer Polymer Solution

To a 5-liter flask fitted with an agitator, condenser, heating mantle, nitrogen inlet, thermocouple and an addition port was added 893.6 grams xylene and the xylene was heated to its reflux temperature of about 135°–139° C. A mixture of monomers of 477.3 grams styrene, 492.6 grams butyl methacrylate, 483.9 grams of butyl acrylate, 263.9 grams hydroxy ethyl acrylate, 49.0 grams methacrylic acid and 327.2 grams isobornyl methacrylate, was added to the flask at a uniform rate over 140 minutes simultaneously with a solution of 127.1 grams tertiary butyl per acetate in 336.5 grams xylene which was added over 270 minutes while maintaining the reaction mixture at its reflux temperature. After the addition of these components, the reaction mixture was held at its reflux temperature for 30 minutes and then 0.9 grams of a 10% solution of beta catechol in isopropanol, 37.2 grams of glycidyl methacrylate, 0.5 grams n,n-dimethyl amino propanol and 8.5 grams xylene were added in the above order shown and the reaction mixture was held at it reflux temperature for an additional 2 hours and then cooled to room temperature. The resulting polymer has a weight average molecular weight was 8257 and the number average molecular weight was 4049.

Preparation of Acrylic Polymer Dispersion 1

To a 2-liter flask fitted with an agitator, condenser, heating mantle, nitrogen inlet, thermocouple and an addition port was added 838.9 grams of the stabilizer polymer solution (prepared above) 28 grams ethyl acetate, 231.0 grams mineral spirits, 495.0 grams heptane, 100 grams isopropanol. This mixture was agitated and heated to its reflux temperature (90° to 93° C.). A solution of 2.1 grams t-butyl peroctoate in 25.0 grams heptane was then added as a shot. This was immediately followed by the uniform addition at reflux over 210 minutes of a pre-mixed solution of 211.3 grams styrene, 281.4 grams hydroxy ethyl acrylate, 522.0 grams methyl methacrylate, 130.8 grams glycidyl methacrylate, 6.7 grams methacrylic acid, 193.6 grams methyl acrylate, 63.5 grams of ethyl acetate, 126.0 grams heptane, 129.0 grams mineral spirits, 21.2 grams t-butyl peroctoate and 421.1 grams of stabilizer polymer solution (prepared above). The reaction mixture was then held at reflux for 45 minutes. A solution of 6.9 grams t-butyl peroctoate in 60.4 grams of butyl acetate was added over 30 minutes and the reaction mixture was then held at reflux for 60 minutes. This was followed by distillation of 270 grams solvent. 49.5 grams of ethanol amine was added over 5 minutes followed by 10 grams methyl ethyl ketone and the reaction mixture was held at 90° C. for 30 minutes. The reaction mixture was then cooled to room temperature. The particle size of the resulting acrylic polymer dispersion was 426 nanometers. Weight per epoxy prior to addition of ethanol amine was 3940 and 35,000 after the addition of ethanol amine.

Coating composition was prepared as follows:

|  | Parts by Weight |
|---|---|
| Portion 1 |  |
| Acrylic Polymer Dispersion (prepared above) | 87.09 |
| Butyl acetate | 19.40 |
| "Tinuvin 384 UV screener from Ciba-Geigy | 2.19 |
| Byk 306 (flow control additive from Byk Chemie | 0.28 |
| "Tinuvin 292 light stabilizer from Ciba-Geigy | 1.39 |
| 1% solution of dibutyl tin dilaurate in methyl ethyl ketone | 1.04 |
| Portion 2 |  |
| Tolonate HDT-LV (isocyanate trimer from Rhone-Poulenc) | 13.77 |
| Butyl acetate | 4.85 |
| Total | 130.01 |

Portion 1 was charged into a mixing vessel and mixed and then Portion 2 was added and mixed with Portion 1. The resulting coating composition was cast on a glass plate (about 2 mils dry film thickness) and cured at room temperature. The resulting coating had a very fast physical dry time (when cotton lightly placed on the coating will not stick) and good 24 hour and final cure hardness (10.5 knoops) and cure properties.

The coating composition had an acceptable pot life. The composition had an initial viscosity of 20 seconds and after 60 minutes had a viscosity of 25 seconds (measured by a zahn 2 paint cup).

EXAMPLE 2

Preparation of Acrylic Polymer Dispersion 2

To a 5-liter flask equipped as in the previous Example, was added 838.9 grams of stabilizer polymer solution (prepared in Example 1), 28.0 grams ethyl acetate, 231.0 grams mineral spirits, 495.0 grams heptane, 100 grams isopropanol and the reaction mixture was heated to its reflux temperature (90°–93° C.). A mixture of 2.1 grams of t-butyl peroctoate and 25 grams of heptane were added as a shot. This was followed by the uniform addition over 210 minutes, while holding the reaction mixture at its reflux temperature, of a mixture of 171.3 grams styrene, 281.4 grams hydroxyethyl acrylate, 477.5 grams methyl methacrylate, 215.4 grams glycidyl methacrylate, 6.7 grams methacrylic acid, 193.6 grams methyl acrylate, 63.5 grams ethyl acetate, 126.0 grams heptane, 129.0 grams mineral spirits, 21.2 grams t-butyl peroctoate and 421.1 grams of stabilizer polymer solution (prepared in Example 1). After a hold period of 45 minutes at reflux temperature, a solution of 6.9 grams of t-butyl peroctoate in 60.4 grams butyl acetate was added over a 30 minute period. The reaction mixture was then held at its reflux temperature for 60 minutes at which time 270 grams of solvent was distilled off. The reaction mixture was cooled to room temperature. The particle size of the acrylic polymer dispersion was 340 nonometers. To a 2 liter flask equipped as above, 600 grams of the non-aqueous dispersion was added and the temperature increased to 50° C. and then 16.5 grams of butyl amine was added followed by the addition of 10 grams of methyl ethyl ketone. The mixture was agitated at 50° C. for 60 minutes and then cooled to room temperature. Weight of epoxy prior to addition of butyl amine was 2350 and was greater than 40,000 after the addition of butyl amine.

A coating composition 2 was prepared as follows:

|  | Parts by Weight |
|---|---|
| Portion 1 |  |
| Acrylic polymer dispersion (prepared above) | 69.03 |
| Butyl acetate | 7.00 |
| Byk 306 (flow control additive from Byk Chemie | 0.20 |
| 1% solution of dibutyl tin dilaurate in methyl ethyl ketone | 1.00 |
| Glacial acetic acid | 0.25 |
| Portion 2 |  |
| Tolonate HDT-LV (isocyanate trimer from Rhone-Poulenc) | 9.42 |
| Total | 86.90 |

Portion 1 was charged into a mixing vessel and mixed and then Portion 2 was added and mixed with Portion 1. The resulting coating composition was cast on a glass plate (about 2 mils dry film thickness) and cured at room temperature. The resulting coating had a very fast physical dry time (when cotton lightly placed on the coating will not stick) and good 24 hour and final cure hardness (140 Newtons/nm$^2$ measured by Fisher Scope Instrument) and good cure properties.

The coating composition had an acceptable pot life. The composition had an initial viscosity of 35 centipoises (ICI viscosity) and did not change over a 30 minute period.

EXAMPLE 3 (comparative)

A linear amine functional polymer solution was prepared by charging the following constituents into a polymerization flask equipped as in Example 1: 238.6 grams of toluene was added and heated to its reflux temperature (112°–115° C.). A mixture of 136.4 grams styrene, 136.4 grams butyl methacrylate, 102.3 grams butyl acrylate, 170.5 grams hydroxy ethyl methacrylate and 136.4 grams tertiary butyl aminoethyl methacrylate was added to the flask at a uniform rate over 240 minutes simultaneously with a solution of 40.9 grams t-butyl peroctoate in 238.6 grams toluene which was added over 260 minutes while maintaining the reaction mixture at its reflux temperature. After the addition of the above components, the reaction mixture was held at its reflux temperature for an additional 30 minutes and then cooled to room temperature. The number average molecular weight of the resulting polymer was 4036 and the weight average molecular weight of the polymer was 12,570.

A coating composition was prepared by charging the following constituents into a mixing vessel:

|  | Parts by Weight |
|---|---|
| Portion 1 | |
| Amine functional polymer solution (prepared above) | 81.57 |
| Butyl Acetate | 60.33 |
| "Exxate" 600 (hexyl acetate) | 2.78 |
| Methyl amyl ketone | 3.32 |
| Xylene | 3.48 |
| Tinuvin ® 384 (UV Screener from Ciba-Geigy) | 2.59 |
| BYK ® 306 (Flow additive from Byk Chemie) | 0.33 |
| Tinuvin ® 292 (Light Stabilizer from Ciba-Geigy) | 1.64 |
| 1% dibutyl tin dilaurate in methyl ethyl ketone | 0.61 |
| Portion 2 | |
| "Desmodur" N-3390-trimer of hexamethylene diisocyanate | 32.07 |
| Butyl Acetate | 11.29 |
| Total | 200.01 |

The constituents of part 1 were charged into the mixing vessel in the order shown with mixing and then the constituents of Part 2 were added with mixing. The composition gelled immediately and was not useable as a coating composition and no film properties could be obtained.

Various modifications, alterations, additions or substitutions of the components of the compositions of this invention will be apparent to those skilled in the art without departing from the scope and spirit of this invention. This invention is not limited to the illustrative embodiments set forth herein, but rather the invention is defined by the following claims.

EXAMPLE 4

Preparation of Acrylic Polymer Dispersion 4

To a 5-liter flask equipped as in the previous Example, was added 838.9 grams of stabilizer polymer solution (prepared in Example 1), 28.0 grams ethyl acetate, 231.0 grams mineral spirits, 495.0 gams heptane, 100 grams isopropanol and the reaction mixture was heated to its reflux temperature (90°–93° C.). A mixture of 2.1 grams of t-butyl peroctoate and 25 grams of heptane were added as a shot. This was followed by the uniform addition over 210 minutes, while holding the reaction mixture at its reflux temperature, of a mixture of 171.3 grams styrene, 281.4 grams hydroxyethyl acrylate, 477.5 grams methyl methacrylate, 215.4 grams glycidyl methacrylate, 6.7 grams methacrylic acid, 193.6 grams methyl acrylate, 63.5 grams ethyl acetate, 126.0 grams heptane, 129.0 grams mineral spirits, 21.2 grams t-butyl peroctoate and 421.1 grams of stabilizer polymer solution (prepared in Example 1). After a hold period of 45 minutes at reflux temperature, a solution of 6.9 grams of t-butyl peroctoate in 60.4 grams butyl acetate was added over a 30 minute period. The reaction mixture was then held at its reflux temperature for 60 minutes at which time 270 grams of solvent was distilled off. The reaction mixture was cooled to room temperature. The particle size of the acrylic polymer dispersion was 340 nanometers. To a 2-liter flask equipped as above, 716 grams of the non-aqueous dispersion was added and the temperature increase to 90° C. and then 72 grams of diketimine of diethylene triamine was added followed by the addition of 12 grams of methyl ethyl ketone. The mixture was agitated at 90° C. for 60 minutes and then cooled to room temperature.

A coating composition 4 was prepared as follows:

A pigmented grind paste was prepared by charging the following ingredients into a mixing vessel.

| Grind Paste Ingredient | Parts by Weight |
|---|---|
| Diketimine Desmophen LS-2965 | 63.60 |
| Butyl Acetate | 7.82 |
| Xylene | 18.40 |
| Methyl Isoamyl Ketone | 29.60 |
| Aliphatic Hydrocarbon Shell Sol 340EC | 25.50 |
| Anti-Terra U | 7.41 |
| Wax Dispersion MPA 60 | 3.15 |
| Bentone 34 Bentonite Clay | 1.98 |
| Methanol | 0.66 |
| Non-aqueous Dispersion Prepared Above | 144.50 |
| Potassium Sodium Silicoaluminate | 21.10 |
| Silica-Alumina Pigment | 95.50 |
| Calcium Carbonate | 207.30 |
| Zinc Phosphate | 121.30 |
| Calcium meta-Silicate | 92.60 |
| Titanium Dioxide | 84.90 |
| Carbon Black | 1.58 |
| Total | 927.00 |

The grind paste was prepared by passing the above mixture through a sandmill until a Hegman fineness at 6.0–6.5 was attained.

The coating composition was prepared by mixing grind paste and following ingredients to make Part-1 of the coating composition:

|  | Parts by Weight |
|---|---|
| Grind Paste (Prepared above) | 927.00 |
| Non-aqueous Dispersion Prepared Above | 44.60 |
| Dibutyl Tin Diacetate, 2% in Xylene | 1.41 |
| BYK 320 Flow Additive | 4.18 |
| Acetic Acid | 0.85 |
| Methyl Ether of Propylene Glycol | 6.43 |
| Methyl Ether-Acetate of Propylene Glycol | 23.40 |
| Total | 1007.10 |

Part 2 of the coating composition was prepared by mixing the following ingredients:

|  | Parts by Weight |
|---|---|
| Tolonate HDT-LV Polyisocyanate | 97.60 |
| Butyl Acetate | 1.70 |
| Methyl Isoamyl Ketone | 9.88 |
| Methyl Amyl Ketone | 20.00 |
| Aliphatic Hydrocarbon Shell Sol 340EC | 58.50 |
| Acetone | 35.90 |
| Oxsol-100 p-Chlorbenzotrifluoride | 61.00 |
| Total | 284.60 |

The coating composition was prepared by adding 80.7 g of Part 2 to 285.7 of Part 1 and mixing. The coating composition had the following viscosities:

| Time (Min) | Zahn No. 2 (Sec) | ICI Cone-Plate (cp) |
|---|---|---|
| 0 | 18.9 | 53 |
| 30 | 22.5 | 60 |
| 60 | 26.3 | 72 |

Spray application of the composition resulted in a smooth coating that dried at ambient temperature conditions and was wet-sandable within 30 minutes of application. The coating composition also had excellent adhesion to a sanded Automotive OEM electrocoat primer and a commercial OEM automotive topcoat. The coating had the following hardness on curing:

| Time (hr) | Persoz Hardness |
|---|---|
| 0.5 | 53 |
| 2.0 | 80 |
| 20.0 | 114 |

We claim:

1. A coating composition comprising about 40–90% by weight of film forming binder and 10–60% by weight of an organic liquid carrier; wherein the binder comprises about
   (a) 50–90% by weight, based on the weight of the binder, of a dispersed acrylic polymer consisting essentially of
      (i) a core of comprising polymerized ethylenically unsaturated monomers which is not soluble in the organic liquid carrier and having amine functionality and having chemically grafted thereto
      (ii) substantially linear stabilizer polymeric components that are soluble in the organic liquid carrier comprising polymerized ethylenically unsaturated monomers and having a weight average molecular weight of about 1,000–20,000 determined by GPC (gel permeation chromatography) using polystyrene as the standard;
         wherein the monomers of the core and the stabilizer polymeric components are individually selected from the group consisting of alkyl (meth) acrylates, wherein the alkyl groups have 1–12 carbon atoms, hydroxy alkyl (meth)acrylate, wherein the alkyl groups have 1–4 carbons atoms, styrene, alkyl styrene, vinyl toluene, acrylonitrile, glycidyl (meth)acrylate, isobornyl (meth)acrylate, alpha-beta ethylenically unsaturated monocarboxylic acids and any mixtures thereof and the core containing 5–40% by weight of polymerized ethylenically unsaturated glycidyl (meth)acrylate monomers reacted with a primary amine or a ketimine forming amine functional components that are capable of reacting with component (b);
   (b) 10–50% by weight, based on the weight of the binder, of an organic polyisocyanate crosslinking agent.

2. The coating composition of claim 1, wherein the dispersed acrylic polymer comprises 30–70% by weight of the core and 70–30% of linear stabilizer polymeric components.

3. The coating composition of claim 1 wherein the linear stabilizer polymeric components are polymerized into the core via a single terminal point of ethylenic unsaturation of the polymeric component.

4. The coating composition of claim 2 in which the core contains about 5–30% by weight of polymerized glycidyl (meth)acrylate reacted with a primary amine or a ketimine.

5. The coating composition of claim 4 in which the glycidyl (meth)acrylate is reacted with an alkanol amine or diketimine.

6. The coating composition of claim 3 in which the stabilizer is the polymerization product of (meth)acrylic acid monomers and monomers selected from the group consisting of styrene, alkyl (meth)acrylate, hydroxy alkyl (meth) acrylate, (meth)acrylic acid, and wherein the carboxyl group of the (meth)acrylic acid is reacted with the glycidyl group of glycidyl (meth)acrylate monomer to form a stabilizer having polymerizable ethylenically unsaturated groups.

7. The coating composition of claim 6 in which the dispersed acrylic polymer is the polymerization product of the stabilizer, (meth)acrylic acid and monomers selected from the group consisting of styrene, alkyl(meth)acrylate and, glycidyl (meth)acrylate and hydroxy alkyl(meth) acrylate and wherein the resulting polymer is reacted with a primary amine or a ketimine.

8. The coating composition of claims 6 and 7 in which the stabilizer is the polymerization product of monomers of styrene, butyl methacrylate, hydroxy ethyl acrylate, isobornyl acrylate, methacrylic acid, wherein the acid is reacted with glycidyl methacrylate to form chains of polymeric linear stabilizer components each having at least one ethylenically unsaturated group and said stabilizer is polymerized with core monomers of styrene, hydroxy ethyl acrylate, methyl methacrylate, glycidyl methacrylate, methyl acrylate and methacrylic acid and subsequently reacted with an alkanol amine or diketimine.

9. The coating composition of claim 1 containing pigment in a pigment to binder ratio of 0.1/100 to 200/100.

10. The coating composition of claim 1 in which the polyisocyanate crosslinking agent is an aliphatic diisocyanate, aromatic diisocyanate, cycloaliphatic diisocyanate, a trifunctional isocyanate, an isocyanate adduct of a polyol and a diisocyanate.

11. A substrate coated with a dried cured layer of the coating composition of claim 1.

12. A coating composition comprising about 40–90% by weight of film forming binder and 10–60% by weight of an organic liquid carrier; wherein the binder comprises about
   (a) 50–90% by weight, based on the weight of the binder, of a dispersed acrylic polymer consisting essentially of
      (i) a core of comprising polymerized ethylenically unsaturated monomers which is not soluble in the organic liquid carrier and having amine functionality and having chemically grafted thereto
      (ii) substantially linear stabilizer polymeric components that are soluble in the organic liquid carrier comprising polymerized ethylenically unsaturated monomers and having a weight average molecular weight of about 1,000–20,000 determined by GPC (gel permeation chromatography) using polystyrene as the standard;
         wherein the monomers of the core and the stabilizer polymeric components are individually selected from the group consisting of alkyl (meth) acrylates, wherein the alkyl groups have 1–12 carbon atoms, hydroxy alkyl (meth)acrylate, wherein the alkyl groups have 1–4 carbons atoms, styrene, alkyl styrene, vinyl toluene, acrylonitrile, glycidyl (meth)acrylate, isobornyl (meth)acrylate, alpha-beta ethylenically unsaturated monocarboxylic acids and any mixtures thereof and the core containing 5–40% by weight of polymerized ethylenically unsaturated alkyl amino alkyl (meth) acrylate monomers providing amine functional components that are capable of reacting with component (b);
   (b) 10–50% by weight, based on the weight of the binder, of an organic polyisocyanate crosslinking agent.

13. The coating composition of claim 12 in which the alkyl amino alkyl (meth)acrylate is t-butyl amino ethyl methacrylate.

14. The coating composition of claim 12 wherein the linear stabilizer polymeric components are polymerized into the core via a single terminal point of ethylenic unsaturation of the polymeric component.

* * * * *